US011556831B2

(12) United States Patent
Kues et al.

(10) Patent No.: US 11,556,831 B2
(45) Date of Patent: Jan. 17, 2023

(54) METHOD AND SYSTEM FOR GENERATION AND CONTROL OF HIGH-DIMENSIONAL MULTI-PARTITE QUANTUM STATES

(71) Applicants: INSTITUT NATIONAL DE LA RECHERCHE SCIENTIFIQUE, Quebec (CA); THE UNIVERSITY COURT OF THE UNIVERSITY OF GLASGOW, Glasgow (GB)

(72) Inventors: Michael Kues, Hannover (DE); Christian Reimer, Lübeck (DE); Stefania Sciara, Montreal (CA); Piotr Roztocki, Longueuil (CA); Luis Romero Cortes, Bellavista (ES); José Azaña, Montreal (CA); Yoann Jestin, Montreal (CA); Roberto Morandotti, Montreal (KY)

(73) Assignees: INSTITUT NATIONAL DE LA RECHERCHE SCIENTIFIQUE; THE UNIVERSITY COURT OF THE UNIVERSITY OF GLASGOW

( * ) Notice: Subject to any disclaimer, the term of this patent is extended or adjusted under 35 U.S.C. 154(b) by 321 days.

(21) Appl. No.: 16/768,667

(22) PCT Filed: Nov. 28, 2018

(86) PCT No.: PCT/CA2018/051512
§ 371 (c)(1),
(2) Date: May 30, 2020

(87) PCT Pub. No.: WO2019/104426
PCT Pub. Date: Jun. 6, 2019

(65) Prior Publication Data
US 2021/0174235 A1 Jun. 10, 2021

Related U.S. Application Data

(60) Provisional application No. 62/591,825, filed on Nov. 29, 2017.

(51) Int. Cl.
*G06N 10/00* (2022.01)
*G02F 1/365* (2006.01)

(52) U.S. Cl.
CPC ............. *G06N 10/00* (2019.01); *G02F 1/365* (2013.01)

(58) Field of Classification Search
CPC ........... G06N 10/00; G02F 1/365; G02F 1/00; B82Y 20/00; B82Y 10/00
See application file for complete search history.

(56) References Cited

U.S. PATENT DOCUMENTS 6,895,092 B2 * 5/2005 Tomita .................. H04L 9/0838
380/278
9,413,470 B1 8/2016 Smith et al.
(Continued)

FOREIGN PATENT DOCUMENTS

JP 2006234810 A * 9/2006 ............. G01N 21/39
WO WO-2007028119 A2 * 3/2007 ............. G01J 11/00
(Continued)

OTHER PUBLICATIONS

C. Reimer et al, "Integrated generation of high-dimensional entangled photon states and their coherent control," in Frontiers in Optics 2017, OSA Technical Digest (online) (Optica Publishing Group, 2017), paper FTh3E.2. (Year: 2017).*
(Continued)

*Primary Examiner* — Tanya T Motsinger
(74) *Attorney, Agent, or Firm* — Lavery, De Billy, LLP; Gwendoline Bruneau

(57) ABSTRACT

A method and a system for generating a hyper-entangled high-dimensional time-bin frequency-bin state, the method comprising generating a hyper-entangled state composed of a time-bin and frequency-bin encoded state, and individually modifying at least one of: i) the amplitude and ii) the phase
(Continued)

of the state components at different frequency-bins and different time-bins of the hyper-entangled state. The system comprises a non-linear medium exited with multiple pulses in broad phase-matching conditions, a frequency mode separator and an amplitude/phase modulator, the frequency mode separator temporally and spatially separating frequency modes of the hyper-entangled state, the amplitude/phase modulator individually modifying at least one of: i) the amplitude (and ii) the phase of the state components at different frequency-bins and different time-bins of the hyper-entangled state.

20 Claims, 4 Drawing Sheets

(56) References Cited

U.S. PATENT DOCUMENTS

| | | | |
|---|---|---|---|
| 9,720,437 | B2 | 8/2017 | Gilbert et al. |
| 10,439,737 | B2 | 10/2019 | Hughes et al. |
| 11,170,318 | B2* | 11/2021 | Ashrafi ............... G02F 3/00 |
| 11,226,538 | B2* | 1/2022 | Marandi ............... G02F 1/39 |
| 2010/0208334 | A1 | 8/2010 | Kanter et al. |
| 2013/0089206 | A1* | 4/2013 | Englund ............ H04L 9/0858 |
| | | | 380/278 |
| 2018/0149476 | A1* | 5/2018 | Huang ................ H04B 10/70 |
| 2020/0041868 | A1* | 2/2020 | Reddy ................ G02F 1/3544 |
| 2020/0274703 | A1* | 8/2020 | Lukens .............. H04L 9/0858 |
| 2020/0409232 | A1* | 12/2020 | Weiner ............... G06N 10/00 |
| 2021/0174235 | A1* | 6/2021 | Kues .................. B82Y 20/00 |
| 2022/0146536 | A1* | 5/2022 | Ramassamy ....... G01N 33/6896 |

FOREIGN PATENT DOCUMENTS

| | | | | |
|---|---|---|---|---|
| WO | WO-2013112351 | A2* | 8/2013 | ......... H04B 10/0795 |
| WO | 2016168920 | A1 | 10/2016 | |
| WO | 2017041174 | A1 | 3/2017 | |
| WO | WO-2021214161 | A1* | 10/2021 | ........... G02F 1/3526 |

OTHER PUBLICATIONS

M. Kues et al "On-chip entangled D-level photon states—scalable generation and coherent processing," in Conference on Lasers and Electro-Optics, OSA Terchnical Digest (online) (Optica Publishing Group, 2018), paper FW4F.2. (Year: 2018).*
C. Reimer, et al "High-dimensional one-way quantum computation operations with on-chip optical d-level cluster states," in Conference on Lasers and Electro-Optics, OSA Technical Digest (Optica Publishing Group, 2019), paper FTh1A.4. (Year: 2019).*
M. Kues et al. "D-dimensional frequency-time entangled cluster states with on-chip frequency combs," in OSA Advanced Photonics Congress (AP) 2019 (IPR, Networks, NOMA, SPPCom, PVLED), OSA Technical Digest (Optica Publishing Group, 2019), paper ITh2A.4. (Year: 2019).*
M. Kues, et al "Optical d-level frequency-time-based cluster states," in 2019 Conference on Lasers and Electro-Optics Europe and European Quantum Electronics Conference, OSA Technical Digest (Optica Publishing Group, 2019), paper eb_4_6. (Year: 2019).*
Raussendorf, R., et al.,. "A One-Way Quantum Computer" Phys. Rev. Lett. 86, 5188-5191 (2001).
Raussendorf, R., et al., "Measurement-based quantum computation on cluster states," Physical Review A, 68, 022312 (2003).
Walther, P., et al., "Experimental one-way quantum computing". Nature 434, 169-176 (2005).
Pan, J.-W., et al., "Experimental test of quantum nonlocality in three-photon Greenberger-Home-Zeilinger entanglement Nature" 403, 515 (2000).
Chen, K. et al., "Experimental Realization of One-Way Quantum Computing with Two-Photon Four-Qubit Cluster States". Phys. Rev. Lett. 99, 120503 (2007).
Yukawa, M., et al., "Experimental generation of four-mode continuous-variable cluster states" Phys. Rev. A 78, 012301 (2008).
Pysher, M., et al., "Parallel Generation of Quadripartite Cluster Entanglement in the Optical Frequency Comb" Phys. Rev. Lett. 107, 030505 (2011).
Roslund, J., et al., "Wavelength-multiplexed quantum networks with ultrafast frequency combs" Nat. Photonics 8, 109-112 (2013).
Babinec, T. M., et al. "A diamond nanowire single-photon source". Nat. Nanotechnol. 5, 195-199 (2010).
Matsuda, N., et al., "A monolithically integrated polarization entangled photon pair source on a silicon chip" Sci. Rep. 2, 817 (2012).
Horn, R. T., et al., "Inherent polarization entanglement generated from a monolithic semiconductor chip" Sci. Rep. 3, 2314 (2013).
Silverstone, J. W., et al., "Qubit entanglement between ring-resonator photon-pair sources on a silicon chip" Nat. Commun. 6, 7948 (2015).
Solntsev, A. S., et al., "Path-entangled photon sources on nonlinear chips" Rev. Phys, doi: 10.1016/j.revip.2016.11.003 (2016).
Xiong, C., et al., "Compact and reconfigurable silicon nitride time-bin entanglement circuit" Optica 2, 724 (2015).
Grassani, D., et al., "Micrometer-scale integrated silicon source of time-energy entangled photons" Optica 2, 88-94 (2015).
Reimer, C., et al., "Generation of multiphoton entangled quantum states by means of integrated frequency combs," Science 351, 1176 (2016).
Kues, M., et al., "On-chip generation of high-dimensional entangled quantum states and their coherent control" Nature 546, 622 (2017).
Toth, G., et al., "Entanglement detection in the stabilizer formalism" Phys. Rev. A 72, 022340 (2005).
Collins, D., et al. "Inequalities for arbitrarily high-dimensional systems" Phys. Rev. Lett. 88, 040404 (2002).
Yao, X., et al., "Experimental demonsliation of topological error correction" Nature 482,489-494 (2012).

* cited by examiner $|\psi_p\rangle = |1,1\rangle(|a,a\rangle + |b,b\rangle + |c,c\rangle)$
$+ |2,2\rangle(|a,a\rangle + |b,b\rangle + |c,c\rangle)$
$+ |3,3\rangle(|a,a\rangle + |b,b\rangle + |c,c\rangle)$ $|\psi_C\rangle = |1,1\rangle(|a,a\rangle + |b,b\rangle + |c,c\rangle)$
$+ |2,2\rangle(|a,a\rangle + \alpha|b,b\rangle + \beta|c,c\rangle)$
$+ |3,3\rangle(|a,a\rangle + \beta|b,b\rangle + \alpha|c,c\rangle)$

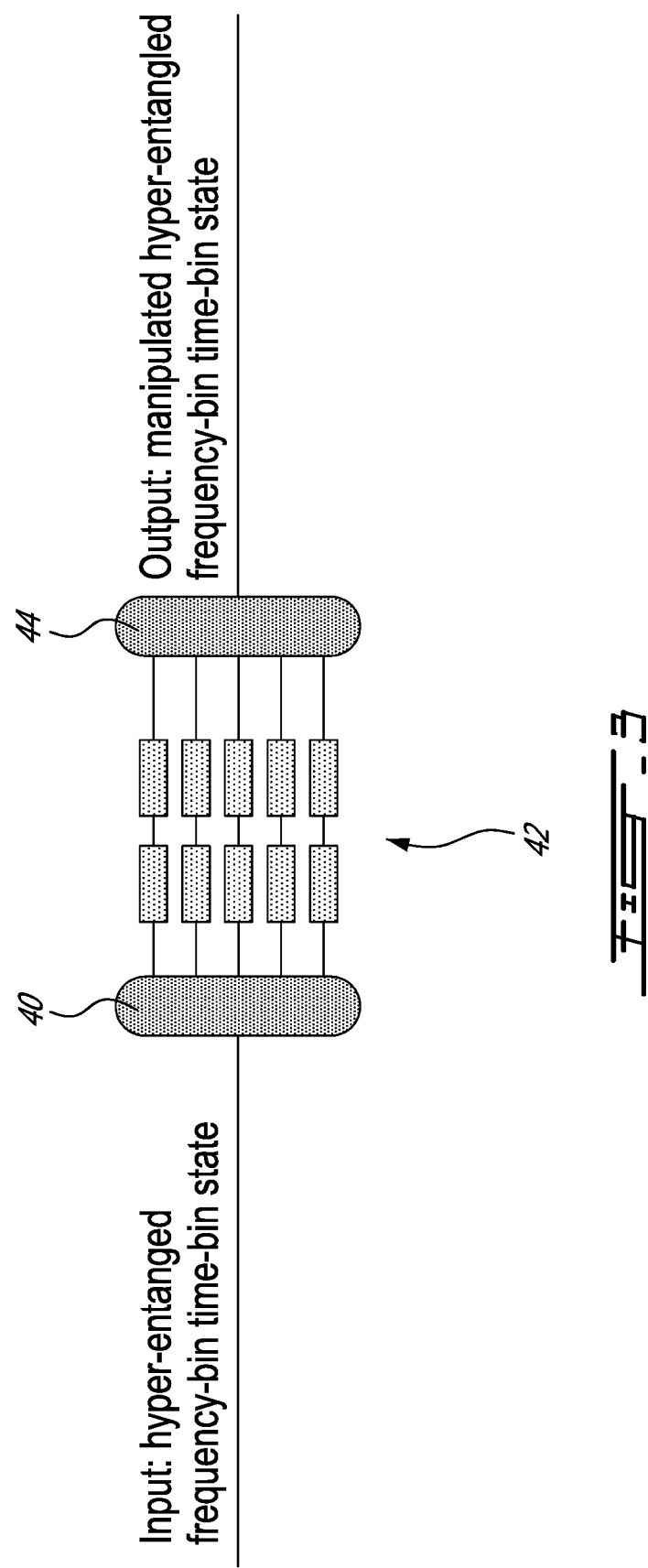

METHOD AND SYSTEM FOR GENERATION AND CONTROL OF HIGH-DIMENSIONAL MULTI-PARTITE QUANTUM STATES

CROSS-REFERENCE TO RELATED APPLICATIONS

This application is a National Entry Application of PCT application No. PCT/CA2018/051512 filed on Nov. 28, 2018, and published in English under PCT Article 21(2), which itself claims benefit of U.S. provisional application Ser. No. 62/591,825 filed on Nov. 29, 2017. All documents above are incorporated herein in their entirety by reference.

FIELD OF THE INVENTION

The present invention relates to a system and a method for the generation and control of high-dimensional multi-partite quantum states.

BACKGROUND OF THE INVENTION

Quantum information processing, especially quantum metrology and quantum computation, uses quantum effects such as superposition and entanglement for increasing the sensitivity of measurement tools beyond classical limits, and for the realization and implementation of powerful computing algorithms, for problems such as sorting or factorization, for example, which are exponentially faster than classical approaches.

For quantum metrology, so-called Greenberger-Home-Zeilinger states ("GHZ states") are of interest because the measurement sensitivity that may be achieved using such states scales with the number of parties in the state.

For quantum computation, the measurement-based quantum computation approach, also referred to as "universal one-way quantum computation", proposed by Briegel and Raussendorf in 2001 [1, 2] requires duster states. Cluster states, being formed of many parties, are multipartite states characterized by a maximal connectedness, each pair of qubits—here photons—being able to be projected with certainty into a maximally-entangled state by performing single-qubit measurements on the other qubits, and the projected state thus depending on the measurement outcome.

Measurement-based quantum computation thus implements algorithms exclusively by means of single-qubit measurements on duster states. To increase the efficiency of such computations, both larger duster states as well as the simultaneous use of several such states are required. Furthermore, the scalability of the duster state source is important, especially with increasing quantum state complexity.

For these reasons, the realization of compact, low-cost, and stable devices for high-dimensional multi-partite quantum state generation and control, which may be multiplexed and packaged, needs to be addressed.

Several different methods to realize optical Greenberger-Home-Zeilinger states and duster states have been demonstrated. For example, using two different spontaneous parametric down-conversion processes in a nonlinear optical crystal, four-photon polarization-entangled states have been created and turned into Greenberger-Home-Zeilinger states or duster states by means of beam splitters and through the individual manipulation of the polarization states [3, 4]. With approaches encoding the quantum resources into more degrees of freedom, such as polarization and spatial modes, two-photon four-mode duster states have been generated by means of nonlinear optical crystals [5], which allowed increasing the generation rate of the quantum states. Instead of exploiting single photons, coherent and squeezed states have been used to generate four-mode multi-entangled states using the coherent locking of multiple optical parametric oscillators [6]. Using this squeezed state method, the ability of generating multiple duster states has also been addressed by exploiting different nonlinear processes from differently phase-matched nonlinear crystals in an optical parametric oscillator [7] or using two or more differently-colored optical waves for exciting optical parametric oscillation [8].

Currently, multi-partite Greenberger-Home-Zeilinger and duster state sources rely on bulk nonlinear crystals and complex free-space optical setups, which makes them very expensive and impractical for use in practical applications. High-dimensional multi-partite Greenberger-Home-Zeilinger or duster states have not been achieved in any quantum platform. Indeed, scaling up the number of quantum states generated in parallel, for bulk four-photon sources or two-photon four-mode sources, would require building up many such free-space setups in parallel, which would lead to footprint sizes not manageable today.

Moreover, a direct transfer of these methods to current integrated photonics platform is currently limited since the currently exploited photon degrees of freedom are impractical for on-chip realizations.

Furthermore, although the use of an optical parametric oscillator, such as a nonlinear crystal in a cavity, allows to massively scale up the number of quantum states generated, the generated quantum states still rely on free-space cavities that need complicated stabilization techniques, making them very impractical for efficient use in practice. Additionally, such sources generate squeezed states which are very vulnerable to optical losses, limiting their usability for quantum computing applications. Moreover, the free-spectral range of the free-space optical parametric oscillators is in the 100 MHz range, making it very complicated to individually manipulate the generated state modes. Finally, these methods are not compatible with current telecommunications technology.

Integrated photonics makes use of the well-developed semiconductor industry to fabricate optical waveguides and functional devices on compact and mass-producible chips, which are increasingly being used to realize stable, low-cost and practical components for optical quantum systems. Such on-chip optical quantum sources are devices emitting single photons [9], as well as two-photon entangled states making use of the polarization [10.11], spatial [12,13], or temporal [14,15] degree of freedom for example. Recently, it has been shown that in contrast to polarization- and/or path-entanglement, which do not allow to access high-dimensional quantum states, except for a massive increase in quantum circuit complexity, the time-bin and frequency-bin entanglement methods may give access to on-chip generation of more complex states. Based on the quantum frequency combs generated from integrated nonlinear micro-cavities, the realization of four-photon states has been demonstrated by using time-bin entanglement [16], and the realization of high-dimensional states has been demonstrated by using frequency-bin entanglement [17].

There is still a need in the art for a system and a method for the generation and control of high-dimensional multi-partite quantum states.

SUMMARY OF THE INVENTION

More specifically, there is provided a method for generating a hyper-entangled high-dimensional time-bin frequency-bin state, comprising generating a hyper-entangled state composed of a time-bin and frequency-bin encoded state, and individually modifying at least one of: I) the amplitude and ii) the phase of the state components at different frequency-bins and different time-bins of the hyper-entangled state.

There is further provided a system for generating a hyper-entangled high-dimensional time-bin frequency-bin state from a hyper-entangled state composed of a time-bin and frequency-bin encoded state, comprising a non-linear medium exited with multiple pulses in broad phase-matching conditions, a frequency mode separator and an amplitude/phase modulator, the frequency mode separator temporally and spatially separating frequency modes of the hyper-entangled state, the amplitude/phase modulator individually modifying at least one of: i) the amplitude and ii) the phase of the state components at different frequency-bins and different time-bins of the hyper-entangled state.

Other objects, advantages and features of the invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 3 is a diagrammatic view of a system array according to an embodiment of an aspect of the present disclosure.

DESCRIPTION OF ILLUSTRATIVE EMBODIMENTS

The present invention is illustrated in further details by the following non-limiting examples.

A method for generating a time-bin and frequency-bin hyper-entangled state according to an embodiment of an aspect of the present disclosure comprises using a hyper-entangled state composed of a time-bin and frequency-bin entangled state as a starting point.

Time-bin and frequency-bin entanglement types may be generated for example through spontaneous nonlinear parametric interactions, such as second- and third-order type nonlinearities, where one or more photons are annihilated to create two new photons, referred to as signal (s) and idler (i), at the same time.

Figure 1A:
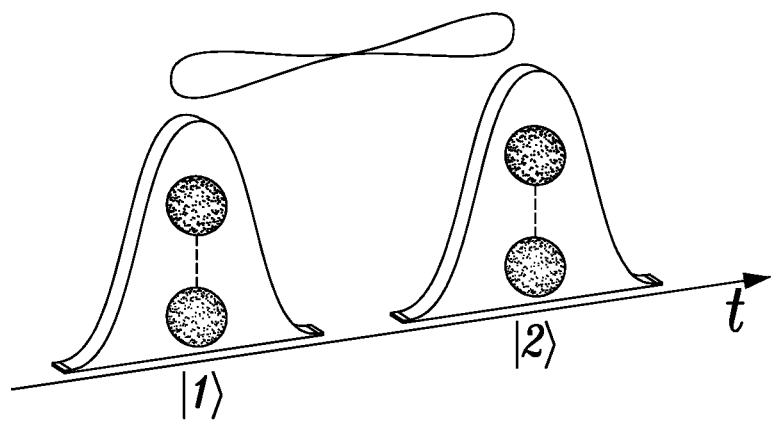
FIG. 1A is a diagrammatical view of two-photon time-bin entangled states.

Due to the nondeterministic behavior, exciting such a process with for example double or multi-pulses, defining two or more temporal modes $|1\rangle$ and $|2\rangle$ allows to create two new photons in a superposition of two or more temporal modes $|\Psi\rangle_t = |1\rangle_s|1\rangle_I + |2\rangle_s|2\rangle_I$, leading to a two-photon time-bin entangled state (see FIG. 1A).

Figure 1B:
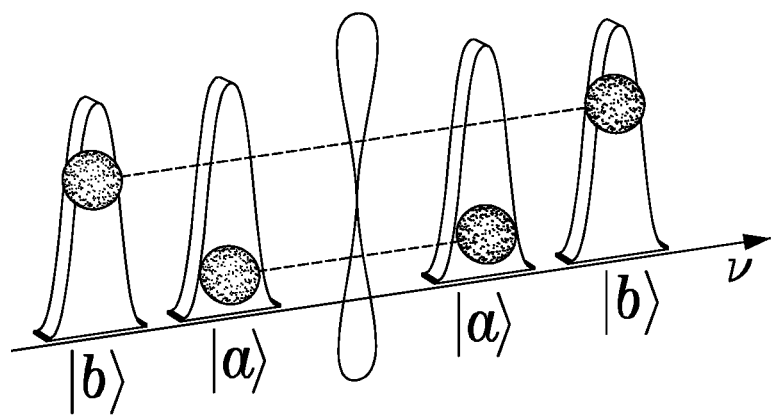
FIG. 1B is a diagrammatical view of two-photon frequency-bin entangled state.
Figure 2A:
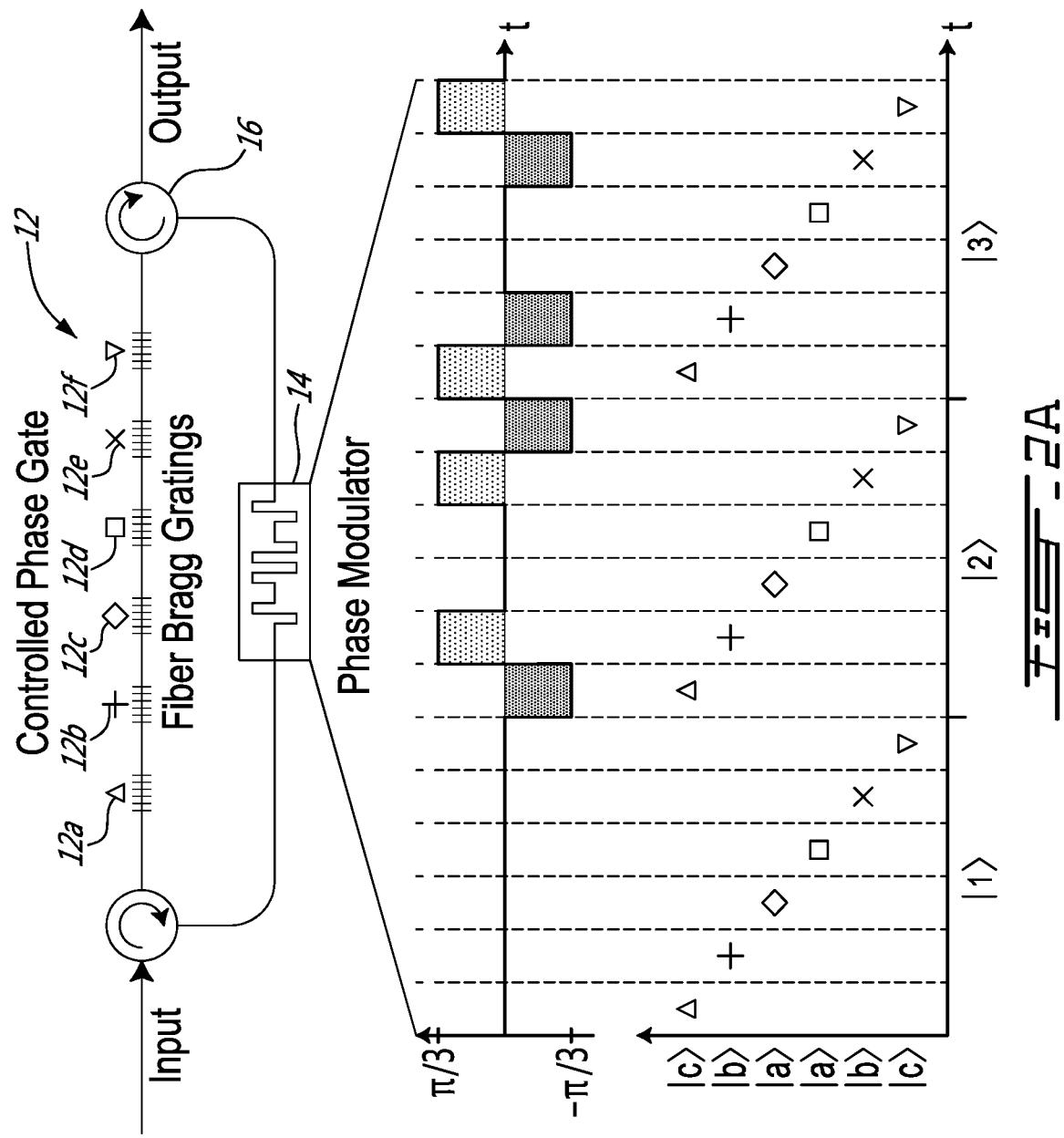
FIG. 2A is a diagrammatic view of a fiber Bragg grating array according to an embodiment of an aspect of the present disclosure.
Figure 2B:
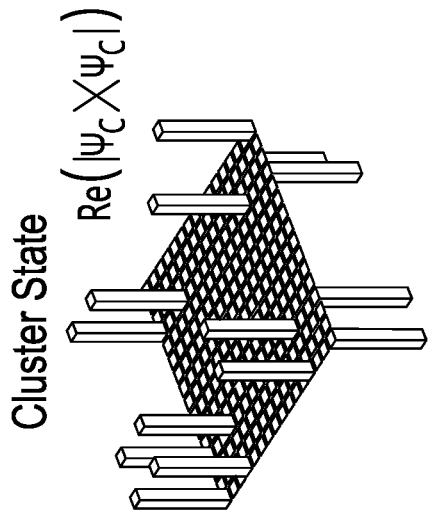
FIG. 2B shows input product states used in the system of FIG. A.
Figure 2B:
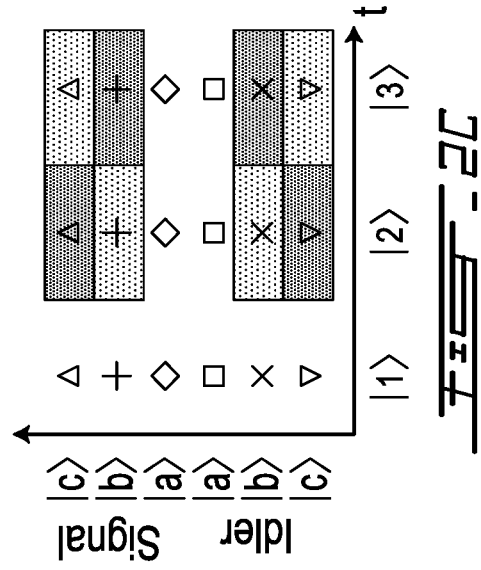
Figure 2C:
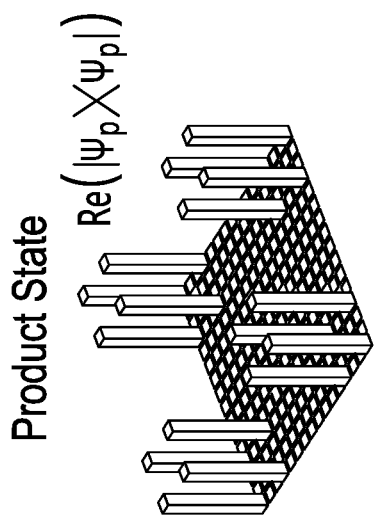
FIG. 2C shows output duster state of the system of FIG. A.
Figure 2C:
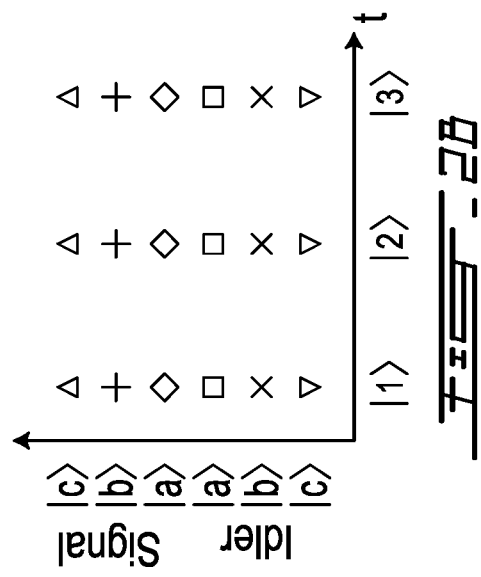

When the phase-matching bandwidth of the spontaneous nonlinear process is larger than the bandwidth of the excitation, frequency correlations are intrinsically generated due to energy conservation. The two new photons are created in a superposition of different frequency components, which may be classified into two or more different frequency-bins $|a\rangle$ and $|b\rangle$, leading to a two-photon frequency-bin entangled state $|\Psi\rangle_f = |a\rangle_s|a\rangle_I + |b\rangle_s|b\rangle_I$. (see FIG. 1B).

Although the time and frequency domains are connected via the Fourier-transformation, these two entanglement types occur on different time scales so that they can be considered independently. Specifically, when using a double pulse excitation, one may measure a frequency-bin entangled state created either in the first 1 or in the second pulse 2 of the double pulse excitation, i.e. a superposition of states, as well as a time-bin entangled state in the frequency mode a or b, i.e. in a superposition. This allows to mathematically multiply both states, resulting in a two-photon four-mode hyper-entangled state as follows:

$$|\Psi\rangle_H = |\Psi\rangle_t \otimes |\Psi\rangle_f = |1\rangle_s|1\rangle_I|a\rangle_s|a\rangle_I + |1\rangle_s|1\rangle_I|b\rangle_s|b\rangle_I + |2\rangle_s|2\rangle_I|a\rangle_s|a\rangle_I + |2\rangle_s|2\rangle_I|b\rangle_s|b\rangle_I.$$

According to an embodiment of an aspect of the present disclosure, a controlled amplitude and phase gate is provided, where the amplitude and phases of all components of this hyper-entangled quantum state may be manipulated independently. If the amplitudes of the second and third terms of the wave-function $|\Psi\rangle_H$ are processed to remove these components, the quantum state is turned into a Greenberger-Horne-Zeilinger state as follows:

$$|G\rangle = \frac{1}{\sqrt{2}}(|1\rangle_s|1\rangle_I|a\rangle_s|a\rangle_I + |2\rangle_s|2\rangle_I|b\rangle_s|b\rangle_I).$$

Additionally, by processing only the phase in a controlled phase gate that accesses the last term of the wave-function $|\Psi\rangle_H$, which corresponds to the second time-bin and second frequency-bin, and changes its phase individually, the initial hyper-entangled product state may be turned into a duster state:

$$|\Psi\rangle_C = \tfrac{1}{2}(|1\rangle_s|1\rangle_I|a\rangle_s|a\rangle_I + |1\rangle_s|1\rangle_I|b\rangle_s|b\rangle_I + |2\rangle_s|2\rangle_I|a\rangle_s|a\rangle_I - |2\rangle_s|2\rangle_I|b\rangle_s|b\rangle_I).$$

The present method may be extended to higher dimensionalities, exploiting the easy dimension scalability of the time- and frequency-bin approach. For example, choosing three time-bins and three frequency-bins yields a nine-component product state that may then be converted into the following duster state:

$$|C, D=3\rangle = \frac{1}{3}\Big\{|1\rangle_s|1\rangle_I(|a\rangle_s|a\rangle_I + |b\rangle_s|b\rangle_I + |c\rangle_s|c\rangle_I) +$$
$$|2\rangle_s|2\rangle_I(|a\rangle_s|a\rangle_I + e^{i\frac{2\pi}{3}}|b\rangle_s|b\rangle_I + e^{-i\frac{2\pi}{3}}|c\rangle_s|c\rangle_I) +$$
$$|3\rangle_s|3\rangle_I(|a\rangle_s|a\rangle_I + e^{-i\frac{2\pi}{3}}|b\rangle_s|b\rangle_I + e^{i\frac{2\pi}{3}}|c\rangle_s|c\rangle_I)\Big\}.$$

For this three-dimensional hyper-entangled four-mode cluster state, the phases are adjusted in such a way that a projection on the frequency-bin or time-bin collapses the system into maximally-entangled states that are orthogonal to each other.

The method may be generalized to achieve Greenberger-Home-Zeilinger and cluster states of arbitrarily-high dimension, i.e. an arbitrarily-large amount of D time-bins and D frequency-bins. It is to be noted that, to generate cluster states and Greenberger-Horne-Zeilinger states, the dimensionality for both the frequency- and time-bin entanglement needs to be the same:

$$|G\ Z_D\rangle = \frac{1}{D}\sum_{k=1}^{D}\bigotimes_{n=1}^{N}|k\rangle_n$$

$$|C, D\rangle = \frac{1}{D^{N/2}}\bigotimes_{a=1}^{N}\left(\sum_{k=1}^{D}|k\rangle_a Z_{a+1}\right).$$

While examples of Greenberger-Horne-Zeilinger and cluster states are provided herein, the present method and system allow performing controlled amplitude and phase operations, allowing to generate a large variety of quantum states, extending beyond just the Greenberger-Horne-Zeilinger and cluster states detailed here, or to use the system to perform state manipulation.

A method according to an embodiment of an aspect of the present disclosure comprises generating a hyper-entangled time-bin, frequency-bin four-mode state, and then processing the amplitude and phase terms of the generated state using a controlled quantum gate.

To generate the hyper-entangled time-bin frequency-bin state, a nonlinear medium providing spontaneous parametric down-conversion or spontaneous four-wave mixing may be used for example. The nonlinear medium may be either non-resonant, such as for example a fiber or waveguide, or a resonant element, such as for example a nonlinear microring resonator. Exciting such nonlinear medium with double pulses, or triple pulses and even more depending on the time-bin dimensionality and assuring a broad phase-matching condition for the nonlinear process directly generates the hyper-entangled state. For non-resonant nonlinear media, the output spectra need to be segmented into different frequency-bins through filters; for resonant nonlinear elements, this filtering is intrinsically accomplished due to the resonance characteristics.

In an implementation discussed herein, an on-chip microring resonator was excited with double, as well as triple pulses. The spontaneous four-wave mixing process creates signal and idler photons both in a superposition of at least three ring resonances, the free spectral range of the resonator being about 200 GHz. The signal and idler photons are frequency-entangled through energy conservation. The state amplitudes were directly measured through projection measurements on the time-bin and frequency-bin bases, $\{|1\rangle, |2\rangle, |3\rangle\}$ and $\{|a\rangle, |b\rangle, |c\rangle\}$, respectively.

To turn this hyper-entangled state into a Greenberger-Horne-Zeilinger, cluster, or different type of quantum state as required for certain applications in sensing, computation or others, it is necessary to change the amplitude and/or phase for different frequency-bins at different time-bins, i.e. the different terms of the state in the wavevector representation. The method comprises mapping the different terms into the temporal domain, using frequency-to-time mapping techniques including, but not limited to, dispersive fibers and fiber-Bragg gratings/waveguides for example, to allow access to the amplitude-phase of each quantum state term individually, by means of temporal amplitude/phase modulators and programmable filters.

In the particular implementation to achieve cluster states described herein, for the frequency-to-time mapping, a fiber Bragg grating (FBG) array 12 was used, formed by six individual fiber Bragg gratings 12a-12f separated by a distance selected to introduce a temporal delay on the reflected frequency components, in the present case 40 cm. Specifically, each fiber Bragg grating reflects a different frequency component at a different spatial position within the fiber, leading to frequency components exiting the fiber Bragg grating in reflection at different times. The reflected frequency components are then routed to an optical phase modulator 16 using a circulator 14. The temporal separation of the different frequency modes, in the present case about 4 ns, was selected to be smaller than the time delay of the time-bin entangled states, in the present case 24 ns, but larger than the temporal coherence of the photons, in the present case 0.6 ns, so that each individual photon temporal and frequency mode may be mapped to a specific arrival time at the modulator 16. Using a time-synchronized phase and/or amplitude modulation profile, generated for example by an arbitrary waveform generator, custom controlled amplitude/phase gates may then be implemented on the hyper-entangled product states. After the modulation step, the photons are sent back to the same fiber Bragg grating but from the opposite direction to reverse the frequency-to-time mapping. For the generation of cluster states only phase modulation is required, while for the generation of Greenberger-Horne-Zeilinger states also amplitude modulation is required (not shown in FIG. 2 for clarity).

Controlled Amplitude/Phase Gate for Time-Bin Frequency-Bin Hyper-Entangled States:

In FIG. 2, the input product state (FIG. 2B) is represented in three different ways. From top to bottom, first the real part of the density matrix is shown for D=2. Below, the equation of the wave-function of the hyper-entangled product state is shown, where time-bins are numbered with 1, 2, 3 and frequency modes with a, b, c. The individual time-frequency mode combinations are displayed at the bottom, symbols being associated with the different frequencies. In the controlled phase gate 12, the six different frequency modes for signal and idler photons are reflected on the six fiber Bragg gratings 12a-12f, generating a 4-ns temporal delay between the modes, the symbol above each fiber Bragg gratings 12a-12f indicating which mode is reflected. After the circulator 14, each temporal and frequency mode occupy a different time-slot. Time-dependent phase patterns are then implemented using an electro-optic amplitude/phase modulator 16. A pattern for D=3 is shown. After the modulation, the photons are sent back to the six fiber Bragg gratings 12a-12f, where the frequency-to-time mapping is reversed (FIG. 2A). In the example for cluster state generation, once a specific phase pattern is implemented, the hyper-entangled state is turned into a cluster state (FIG. 2C). For visualization, the real part of the density matrix for D=2 (top) is shown, as well as their wave-function (D=2: $\alpha$=exp ($i\pi$)=−1, D=3: $\alpha$=exp ($i2\pi/3$), $\beta$=exp ($-i2\pi/3$)). The bottom graph shows which modes phases were added.

Such a controlled amplitude and phase gate may be extended to even higher dimensions by considering more frequency components and adding corresponding fiber Bragg gratings, as well as using optical excitation comprising a higher number of coherent pulses, provided that the temporal separation of the six fiber Bragg gratings is larger than the coherence time of the photons, and that the speed of the electro-optic modulator is sufficient to perform the required modulations. Since the quantum state passes through the same fiber Bragg gratings array from both directions, imperfections in the time or phase delay caused by the fiber Bragg gratings are intrinsically compensated.

The full system is also intrinsically phase stable since the quantum state propagates within a single waveguide mode.

Alternative embodiments, without the use of circulators, comprises using a frequency beam-splitting element 40 such as a wavelength division multiplexing filter, diffraction grating, or an arrayed waveguide grating for separating the frequency modes on input hyper-entangled frequency bin-time-bin state, then implementing time-synchronized modulation of the quantum state in separate spatial modes, using phase and/or amplitude modulator 42, before frequency recombining using dense Wavelength Division Multiplexing (DWDM) or arrayed waveguide gratings 44 for example (see FIG. 3 for example). Such a method requires a phase-stable configuration, which may be achievable for example by means of on-chip integration.

To confirm that the system and method generate hyper-entangled quantum states and manipulate them successfully in the controlled quantum gate, two- and three-dimensional cluster states were experimentally characterized. Cluster state witness measurements were performed, which confirmed that the product states were successfully turned into cluster states. Such a witness provides a measure that detects the presence of a specific type of entanglement. As the measured expectation value of the cluster state witness operator was negative, a cluster state was confirmed.

A negative witness value was measured, which represents the first realization of high-dimensional multipartite quantum states with N=4 parties and D=3 dimensions. The quantum state has a Hilbert space dimensionality of $D^V$=81, which is equivalent to 6.34 qubits, being already comparable to the largest optical cluster states experimentally achieved, in non-integrated systems [20]. Most remarkably, this large Hilbert space is obtained with only two photons, highlighting the massive potential for scalability.

As people in the art will appreciate, there is provided a method and a system for the generation of multipartite and high-dimensional quantum states, based on the simultaneous exploitation of the time and frequency degrees of freedom of a photon and the subsequent time-synchronized phase rotation and/or amplitude manipulation of single quantum state terms.

The method provides generation of hyper-entanglement states via frequency-bin and time-bin entanglement, and modification of the states, for example by a controlled amplitude and phase gate or other forms of modification in the time domain.

The method allows generating high-dimensional multipartite quantum states which are hyper-entangled product states of two-partite maximally-entangled quantum states.

The method allows transforming the hyper-entangled states into different quantum states such as, but not limited to, Greenberger-Horne-Zeilinger or cluster states.

The method is directly compatible with today's photonics microfabrication technologies, as well as telecommunications technologies, and may be implemented using inexpensive off-the-shelf devices.

The method is fully scalable and may be extended to any amount of modes or photons, generating large multi-partite and high-dimensional entangled quantum states.

The method may be used to multiplex multiple sources. Several such gates may also be concatenated, or used in combination with other state manipulation components, for example programmable spectral filters, modulators, excitation field control, etc.

The method allows using on-chip frequency comb sources and standard telecommunications components, making the final device small, compact and scalable, a set of requirements of great importance for future market-ready quantum computing devices. Furthermore, the method scalability to higher dimensionality, allowing putting more quantum information into the two-photon four-partite state, in contrast to other approaches to increase information capacity that are based on using more photons (i.e. instead of two, four etc.), which drastically reduces the state detection rates. Finally, the method may be entirely integrated on a photonic chip, allowing for a production and commercialization thereof.

The present method and system overcome previous limitations regarding increasing quantum state complexity and quantum state control. Here, the time and frequency photon degrees of freedom are used simultaneously. On-chip non-linear resonant structures and commonly-used telecommunications fiber components may be used.

The present method for the generation of high-dimensional and multi-partite optical quantum states simultaneously uses the photons' temporal and frequency degrees of freedom, and the control of these states by means of a controlled amplitude and phase gate. The versatility of the method may be used to realize and control a broad range of states. Herein, an implementation was discussed for the generation of high-dimensional Greenberger-Horne-Zeilinger (GHZ) and high-dimensional Cluster states.

The scope of the claims should not be limited by the embodiments set forth in the examples but should be given the broadest interpretation consistent with the description.

REFERENCES

[1] Raussendorf, R. & Briegel, H. J. A One-Way Quantum Computer. *Phys. Rev. Lett.* 86, 5188-5191 (2001)

[2] Raussendorf, R. et al., "Measurement-based quantum computation on cluster states," Physical Review A, 68, 022312(2003)

[3] Walther, P. et al., Experimental one-way quantum computing. *Nature* 169, 169-176 (2005).

[4] Pan, J.-W. et al. Experimental test of quantum nonlocality in three-photon Greenberger-Horne-Zeilinger entanglement *Nature* 403, 515(2000).

[5] Chen, K. et al. Experimental Realization of One-Way Quantum Computing with Two-Photon Four-Qubit Cluster States. *Phys, Rev, Lett,* 99, 120503 (2007).

[6] Yukawa, M., Ukai, R., van Loock, P. & Furusawa, A. Experimental generation of four-mode continuous-variable cluster states. *Phys. Rev. A* 78, 012301 (2008).

[7] Pysher, M., Miwa, Y., Shahrokhshahi, R., Bloomer, R. & Pfister, O. Parallel Generation of Quadripartite Cluster Entanglement in the Optical Frequency Comb. *Phys. Rev. Lett.* 107, 030505 (2011).

[8] Roslund, J., de Araujo, R. M., Jiang, S., Fabre, C. & Treps, N. Wavelength-multiplexed quantum networks with ultrafast frequency combs. *Nat. Photonics* 8, 109-112 (2013).

[9] Babinec, T. M. et al. A diamond nanowire single-photon source. *Nat. Nanotechnol.* 5, 195-199 (2010).

[10] Matsuda, N. et al. A monolithically integrated polarization entangled photon pair source on a silicon chip. *Sci. Rep* 2, 817 (2012).

[11] Horn, R. T. et al. Inherent polarization entanglement generated from a monolithic semiconductor chip. *Sci. Rep* 3, 2314 (2013).

[12] Silverstone, J. W. et al. Qubit entanglement between ring-resonator photon-pair sources on a silicon chip. *Nat. Commun.* 6, 7948 (2015).

[13] Solntsev, A. S. & Sukhorukov, A. A. Path-entangled photon sources on nonlinear chips. *Rev, Phys*, doi: 10.1016/j.revip.2016.11.003 (2016).

[14] Xiong, C. et al. Compact and reconfigurable silicon nitride time-bin entanglement circuit. *Optica* 2, 724 (2015).

[15] Grassani, D. et al. Micrometer-scale integrated silicon source of time-energy entangled photons. *Optica* 2, 88-94 (2015).

[16] C. Reimer, M. Kues, P. Roztocki, B. Wetzel, F. Grazioso, B. E. Little, S. T. Chu, T. Johnston, Y. Bromberg, L. Caspani, D. J. Moss, and R. Morandotti, "Generation of multiphoton entangled quantum states by means of integrated frequency combs," Science 351, 1176 (2016).

[17] M. Kues, C. Reimer, P. Roztocki, L. Romero Cortes, S. Sciara, B. Wetzel, Y. Zhang, A. Cino, B. E. Little, S. T. Chu, D. J. Moss, L. Caspani, J. Azãna, and R. Morandotti, "On-chip generation of high-dimensional entangled quantum states and their coherent control," Nature 546, 622 (2017).

[18] G. Toth, O. Guehne, Entanglement detection in the stabilizer formalism. Phys. Rev. A 72, 022340 (2005).

[19] Collins, D., Gisin, N., Linden, N., Massar, S. & Popescu, S. Bell inequalities for arbitrarily high-dimensional systems. Phys. Rev. Lett. 88, 040404 (2002).

[20] X. Yao, T. Wang, H. Chen, W. Gao, A. G. Fowler, R. Raussendorf, Z. Chen, N. Liu, C. Lu, Y. Deng, Y. Chen & J. Pan, Experimental demonstration of topological error correction, Nature 482, 489-494 (2012).

The invention claimed is:

1. A method for generating a hyper-entangled high-dimensional time-bin frequency-bin state from a hyper-entangled state composed of a time-bin and frequency-bin encoded state, comprising generating a hyper-entangled state composed of a time-bin and frequency-bin encoded state using a non-linear medium exited with multiple pulses in broad phase-matching conditions, and individually modifying at least one of: i) the amplitude and ii) the phase of the state components at different frequency-bins and different time-bins of the hyper-entangled state, by temporally and spatially separating frequency modes of the hyper-entangled state and modifying the at least one of: i) the amplitude and ii) the phase of the state components at different frequency-bins and different time-bins of the hyper-entangled state.

2. The method of claim 1, wherein said modifying at least one of: i) the amplitude and ii) the phase of different state components at frequency-bins and time-bins of the hyper-entangled state comprises frequency-to-time-to-frequency mapping; and at least one of: i) phase modulating and ii) amplitude modulating.

3. The method of claim 1, wherein said modifying at least one of: i) the amplitude and ii) the phase of different state components at frequency-bins and time-bins of the hyper-entangled state comprises frequency-to-time-to-frequency mapping using one of: dispersive fibers, fiber-Bragg gratings and fiber-Bragg waveguides, and at least one of: i) phase modulating and ii) amplitude modulating.

4. The method of claim 1, wherein said modifying at least one of: i) the amplitude and ii) the phase of different state components at frequency-bins and time-bins of the hyper-entangled state comprises temporally and spatially separating frequency modes of the hyper-entangled state, and at least one of individually i) phase modulating and ii) amplitude modulating the frequency modes.

5. The method of claim 1, comprising exciting the non-linear medium with multiple laser pulses depending on a target time-bin dimensionality in broad phase-matching conditions.

6. The method of claim 1, wherein the non-linear medium is a non-resonant non-linear medium, the method comprising exciting the non-resonant non-linear medium with multiple pulses in broad phase-matching conditions and segmenting output spectra into different frequency bins.

7. The method of claim 1, wherein the non-linear medium is a -resonant non-linear medium, the method comprising exciting the resonant non-linear medium with multiple pulses in broad phase-matching conditions.

8. The method of claim 1, comprising exciting a nonlinear microring resonator with multiple pulses in broad phase-matching conditions.

9. The method of claim 1, wherein said modifying at least one of: i) the amplitude and ii) the phase comprises using a controlled quantum gate.

10. The method of claim 1, comprising modifying the amplitude, thereby turning the hyper-entangled state into a Greenberger-Horne-Zeilinger state.

11. The method of claim 1, comprising modifying the phase, thereby turning the hyper-entangled state into a cluster state.

12. A system for generating a hyper-entangled high-dimensional time-bin frequency-bin state from a hyper-entangled state composed of a time-bin and frequency-bin encoded state, comprising a non-linear medium exited with multiple pulses in broad phase-matching conditions, a frequency mode separator and an amplitude/phase modulator, said frequency mode separator temporally and spatially separating frequency modes of the hyper-entangled state, said amplitude/phase modulator individually modifying at least one of: i) the amplitude and ii) the phase of the state components at different frequency-bins and different time-bins of the hyper-entangled state.

13. The system of claim 12, wherein said non-linear medium is one of: a resonant and a non-resonant medium.

14. The system of claim 12, wherein said non-linear medium is a non-resonant medium, the system comprising filters for segmenting output spectra into different frequency bins.

15. The system of claim 12, wherein said non-linear medium is a nonlinear microring resonator, the system comprising filters for segmenting output spectra into different frequency bins.

16. The system of claim 12, wherein said non-linear medium is one of: fibers and waveguides.

17. The system of claim 12, wherein said non-linear medium is a nonlinear microring resonator.

18. The system of claim 12, wherein said frequency mode separator comprises one of: dispersive fibers, fiber-Bragg gratings and fiber-Bragg waveguides.

19. An amplitude and phase quantum gate, comprising a frequency mode separator and an amplitude/phase modulator, said frequency mode separator temporally and spatially separating frequency modes of an hyper-entangled state composed of a time-bin and frequency-bin encoded state, said amplitude/phase modulator individually modifying at least one of: i) the amplitude and ii) the phase of the state components at different frequency-bins and different time-bins of the hyper-entangled state.

20. The amplitude and phase quantum gate of claim 19, wherein said frequency mode separator comprises one of: dispersive fibers, fiber-Bragg gratings and fiber-Bragg waveguides.

* * * * *